(12) United States Patent
Kojima et al.

(10) Patent No.: US 8,390,410 B2
(45) Date of Patent: Mar. 5, 2013

(54) ELECTROMAGNETIC RELAY

(75) Inventors: Kiyonari Kojima, Nishikamo-gun (JP); Hisanaga Matsuoka, Okazaki (JP); Atsuo Okabayashi, Toyota (JP); Yuuko Okabayashi, legal representative, Toyota (JP); Seiko Okabayashi, legal representative, San Francisco, CA (US); Haruo Okabayashi, legal representative, Toyota (JP); Hitoshi Sunohara, Chita-gun (JP); Makoto Kamiya, Nishio (JP); Manabu Ozaki, Anjo (JP); Wataru Hirose, Takahama (JP)

(73) Assignees: Nippon Soken, Inc., Nishio (JP); Denso Corporation, Kariya (JP); Anden Co., Ltd., Anjo (JP)

( * ) Notice: Subject to any disclaimer, the term of this patent is extended or adjusted under 35 U.S.C. 154(b) by 0 days.

(21) Appl. No.: 12/780,276

(22) Filed: May 14, 2010

(65) Prior Publication Data
US 2010/0289604 A1  Nov. 18, 2010

(30) Foreign Application Priority Data

May 14, 2009 (JP) ................................. 2009-117348

(51) Int. Cl.
*H01H 9/30* (2006.01)
*H01H 51/22* (2006.01)
(52) U.S. Cl. ........................... 335/201; 335/78; 335/128
(58) Field of Classification Search ............ 335/78–86, 335/124, 128–135, 201
See application file for complete search history.

(56) References Cited

U.S. PATENT DOCUMENTS

| | | | | | |
|---|---|---|---|---|---|
| 4,367,448 | A | * | 1/1983 | Nishizako | 335/201 |
| 4,389,626 | A | * | 6/1983 | Schedele | 335/78 |
| 4,404,443 | A | * | 9/1983 | Coynel et al. | 218/23 |
| 5,546,061 | A | * | 8/1996 | Okabayashi et al. | 335/78 |

(Continued)

FOREIGN PATENT DOCUMENTS

| | | |
|---|---|---|
| CN | 1327604 | 12/2001 |
| JP | 4-248213 | 9/1992 |

(Continued)

OTHER PUBLICATIONS

Office Action (7 pgs.) dated Aug. 31, 2012 issued in corresponding Chinese Application No. 201010225746.4 with an at least partial English-language translation thereof (11 pgs.).

(Continued)

*Primary Examiner* — Bernard Rojas
(74) *Attorney, Agent, or Firm* — Nixon & Vanderhye P.C.

(57) ABSTRACT

An electromagnetic relay switches to conduct and interrupt currents having different magnitudes and flowing though mutually opposite paths via the electromagnetic relay. The relay includes a coil generating a magnetic force and a pair of contact sections opened and closed selectively by the magnetic force. The contact sections comprise a pair of fixed contacts and a pair of movable contacts. Each fixed contacts is held by a pair of conductive fixed holders and is near a tip section of each fixed holder. The movable contacts are fixed to a conductive movable holder and moves toward and away from the fixed holders selectively in response to the magnetic force. The relay further includes two arc-extinguishing magnet members adjacent to the contact sections such that, the arc generated by interrupting one current having a magnitude larger than the other current is extended toward the tip section at each contact section.

21 Claims, 13 Drawing Sheets

U.S. PATENT DOCUMENTS

| | | | |
|---|---|---|---|
| 6,075,429 A * | 6/2000 | Uotome et al. | 335/78 |
| 6,700,466 B1 * | 3/2004 | Yamamoto et al. | 335/132 |
| 6,853,275 B2 * | 2/2005 | Sato et al. | 335/128 |
| 7,145,422 B2 * | 12/2006 | Imanishi et al. | 335/201 |
| 7,541,901 B2 * | 6/2009 | Nakano et al. | 335/201 |
| 7,782,162 B2 * | 8/2010 | Nishida | 335/201 |
| 8,093,974 B2 * | 1/2012 | Nagura et al. | 335/201 |
| 8,193,881 B2 | 6/2012 | Yuba et al. | |
| 2009/0072935 A1 * | 3/2009 | Yuba et al. | 335/201 |
| 2010/0066471 A1 * | 3/2010 | Nagura et al. | 335/201 |
| 2010/0207713 A1 * | 8/2010 | Sugisawa | 335/192 |
| 2012/0223790 A1 | 9/2012 | Yuba et al. | |

FOREIGN PATENT DOCUMENTS

| | | |
|---|---|---|
| JP | 10326553 A * | 12/1998 |
| JP | 2002-334644 | 11/2002 |
| JP | 2008-226547 | 9/2008 |
| JP | 2009-87918 | 4/2009 |

OTHER PUBLICATIONS

Office Action (2 pgs.) dated Oct. 16, 2012 issued in corresponding Japanese Application No. 2009-117348 with an at least partial English-language translation thereof (2 pgs.).

* cited by examiner

EXTENDING DIRECTION ← → TIP DIRECTION

ELECTROMAGNETIC RELAY

CROSS-REFERENCE TO RELATED APPLICATION

This application is based on and claims the benefit of priority from earlier Japanese Patent Application No. 2009-117348 filed May 14, 2009, the description of which is incorporated herein by reference.

BACKGROUND OF THE INVENTION

1. Field of the Invention

The present invention relates to an electromagnetic relay that switches between conducting and interrupting currents flowing through the electromagnetic relay, the currents being two types of currents of which magnitudes are different from each other and which flow through mutually opposite paths which are via the electromagnetic relay.

2. Description of the Related Art

Conventionally, an electromagnetic relay is known that is used as a relay in a driving circuit in an electric vehicle, a hybrid vehicle, and the like. The electromagnetic relay is used to switch between conducting and interrupting a current.

As shown in FIG. 1 and FIG. 2, an electromagnetic relay 9 includes a pair of contact sections 93. Each contact section 93 is configured by a movable contact 931 and a fixed contact 932. The contact section 93 is opened and closed by a magnetic force from a coil (not shown). The pair of fixed contacts 932 are held by a fixed holder 934. The pair of movable contacts 931 are held by a movable holder 933 such as to mutually short-circuit. The contact sections 93 are opened and closed by the movable holder 933 moving toward and away from the fixed holder 934 by the magnetic force from the coil.

In the electromagnetic relay 9, when the coil is energized, the contact sections 93 are closed by the magnetic force generated by the coil, creating a conductive state. When the coil is de-energized, the magnetic flux of the coil disappears. The contact sections 93 are opened, creating an interrupted state.

During transition from the conductive state to the interrupted state, an arc 8 may be generated in the contact section 93, as shown in FIG. 2. Arc-extinguishing magnet members 94 are disposed in the electromagnetic relay 9 to extinguish the arc 8, as shown in FIG. 1. Each arc-extinguishing magnet member 94 is disposed adjacent to the outer side of each contact section 93 (refer to, for example, Japanese Patent Laid-open Publication No. 2008-226547).

As a result of a magnetic field being generated by the arc-extinguishing magnet member 94 in the space in which the arc 8 is generated, Lorentz force F acts on the arc 8, thereby extending the arc 8. As a result, the arc 8 can be extinguished while preventing increase in the distance between the contacts in the contact section 93. In FIG. 2, reference number 8a indicates the arc 8 in a state prior to being extended. Reference number 8b indicates the arc 8 in the extended state. The same applies to FIG. 3, described hereafter.

However, when the arc 8 is extended by the Lorentz force F as described above, both end points 83 and 84 of the arc 8 may move from the fixed contact 932 and the movable contact 931 to the fixed holder 934 and the movable holder 933. Here, as shown in FIG. 1, the length direction of the movable holder 933 is perpendicular to the direction in which the arc 8 is extended. The length direction of the fixed holder 934 is roughly parallel with the direction in which the arc 8 is extended. Therefore, as shown in FIG. 3, when the direction in which the arc 8 is extended and the extending direction of the fixed holder 934 match, one end point 83 of the arc 8 moves along the fixed holder 934, making extension of the arc 8 difficult. Therefore, when the direction in which the arc 8 is extended and the extending direction of the fixed holder 934 match, the arc 8 cannot be sufficiently extended. Arc-extinction may become difficult to perform.

Therefore, a design is considered in which the direction in which the arc 8 is extended and the extending direction of the fixed holder 934 are opposite directions to each other.

However, when the electromagnetic relay 9 is used as a relay in a driving circuit in an electric vehicle, a hybrid vehicle, and the like, the directions of the current flow through the electromagnetic relay 9 during power running and during regeneration are opposite. Therefore, the directions in which the arc 8 is extended when the current is interrupted during power running and when the current is interrupted during regeneration are opposite. In either one of the instances, the direction in which the arc 8 is extended matches the extending direction of the fixed holder 934. In FIG. 1, solid-line arrows indicate the arc 8 generated when the current is interrupted during power running. Broken-line arrows indicate the arc 8 generated when the current is interrupted during regeneration.

In this way, at each of the two contact sections 93, the direction in which the arc 8 is extended and the extending direction of the fixed holder 934 cannot to be set to be opposite to each other when any one of the currents flowing in the two mutually-opposite directions is interrupted.

SUMMARY OF THE INVENTION

The present invention has been achieved in light of the above-described problems. An object of the present invention is to provide an electromagnetic relay that can smoothly interrupt currents whose magnitudes are different from each other and which flow through opposite paths via the electromagnetic relay.

According to one aspect of the invention, there is provided an electromagnetic relay that switches between conducting and interrupting currents flowing through the electromagnetic relay, the currents being two types of currents which are different in magnitudes from each other and which flow through mutually opposite paths which are via the electromagnetic relay. The present electromagnetic relay includes a coil that generates a magnetic force by being energized, a pair of contact sections that open and close by the magnetic force, and two arc-extinguishing magnet members. The pair of contact sections include a pair of fixed contacts and a pair of movable contacts, the pair of fixed contacts being held by a pair of fixed holders made of conducting material, each fixed contact being held near a tip section of each of the fixed holders, the pair of movable contacts being fixed to a movable holder made of conducting material, disposed to be opposed to the pair of fixed contacts, and formed to move toward and away from the fixed holders in response to the magnetic force. The two arc-extinguishing magnet members spatially extend (i.e., pull or move) the arc generated at each of the contact sections to extinguish the arc, each arc-extinguishing magnet member being adjacent to one of the contact sections such that, the arc generated by interrupting the current flow path, of the two types of currents, one current having an magnitudes larger than the other current is extended (i.e., pulled or moved) toward the tip section of each of the fixed holders at each of the contact sections.

In the present description and specification later described, the two types of currents consist of a "large current" having a magnitude larger than the other and a "small current" having a magnitude smaller than the other. Both of the large and small currents flow through mutually opposite paths via the electromagnetic relay. By selectively energizing or non-energizing the coil, each of the large and small currents can be switched on/off (conducted/interrupted).

Hence, in each of both contact sections, the direction in which the arc-extinguishing magnet member extends the arc generated when a large current is interrupted agrees with a direction directed to the tip (i.e., the tip direction) of the fixed holder. The large current can thus be smoothly interrupted with a suppressed arc. This means that priority for extinguishing the arc is given to the structure to extend the arc which will be caused when the larger current is interrupted. This will lead to a reliable extinguishment for both large and small currents. The reason is as follows.

The direction in which the arc-extinguishing magnet member extends the arc changes to an opposite direction depending on the direction of the current flow when the current is interrupted. Therefore, as described above, the electromagnetic relay cannot be set such that the direction in which the arc is extended agrees with the tip direction of the fixed holder when either current is interrupted.

However, although the arc is required to be extended by a greater distance to extinguish the arc generated when the large current is interrupted, when an arc generated when a small current is interrupted is extinguished, the distance by which the arc is extended is relatively small. Therefore, even when the direction in which the arc generated when the small current is interrupted is extended matches an extending direction of the fixed holder (which is opposite to the tip direction) and the distance by which the arc is extended is small, arc extinction can be performed relatively smoothly. On the other hand, when the direction in which the arc (large current arc) generated when the large current is interrupted is extended matches the extending direction of the fixed holder and the distance by which the arc is extended is small, arc extinction may be difficult to perform.

Therefore, the present invention is configured such that the direction in which the arc-extinguishing magnet member extends the arc generated when the large current is interrupted agrees with the tip direction of the fixed holder. As a result, the arc generated when the large current is interrupted can be extended with ease. Arc extinction can thus be facilitated as a whole.

As a result, the arc can be smoothly extinguished when the large current and the small currents made to selectively flow in the mutually opposite directions are interrupted reliably.

The electromagnetic relay of the present invention is used, for example, as a relay in a high-voltage circuit for driving in an electric vehicle, a hybrid vehicle, and the like.

BRIEF DESCRIPTION OF THE DRAWINGS

In the accompanying drawings.

DETAILED DESCRIPTION OF THE PREFERRED EMBODIMENTS

With reference to the accompanying drawings, various embodiments according to the present invention will be described.

First Embodiment

With reference to FIG. 4 to FIG. 10, an electromagnetic relay according to a first embodiment of the present invention will now be described.

An electromagnetic relay 1 according to the first embodiment switches between conducting and interrupting currents in both directions having mutually different sizes.

Figure 1:
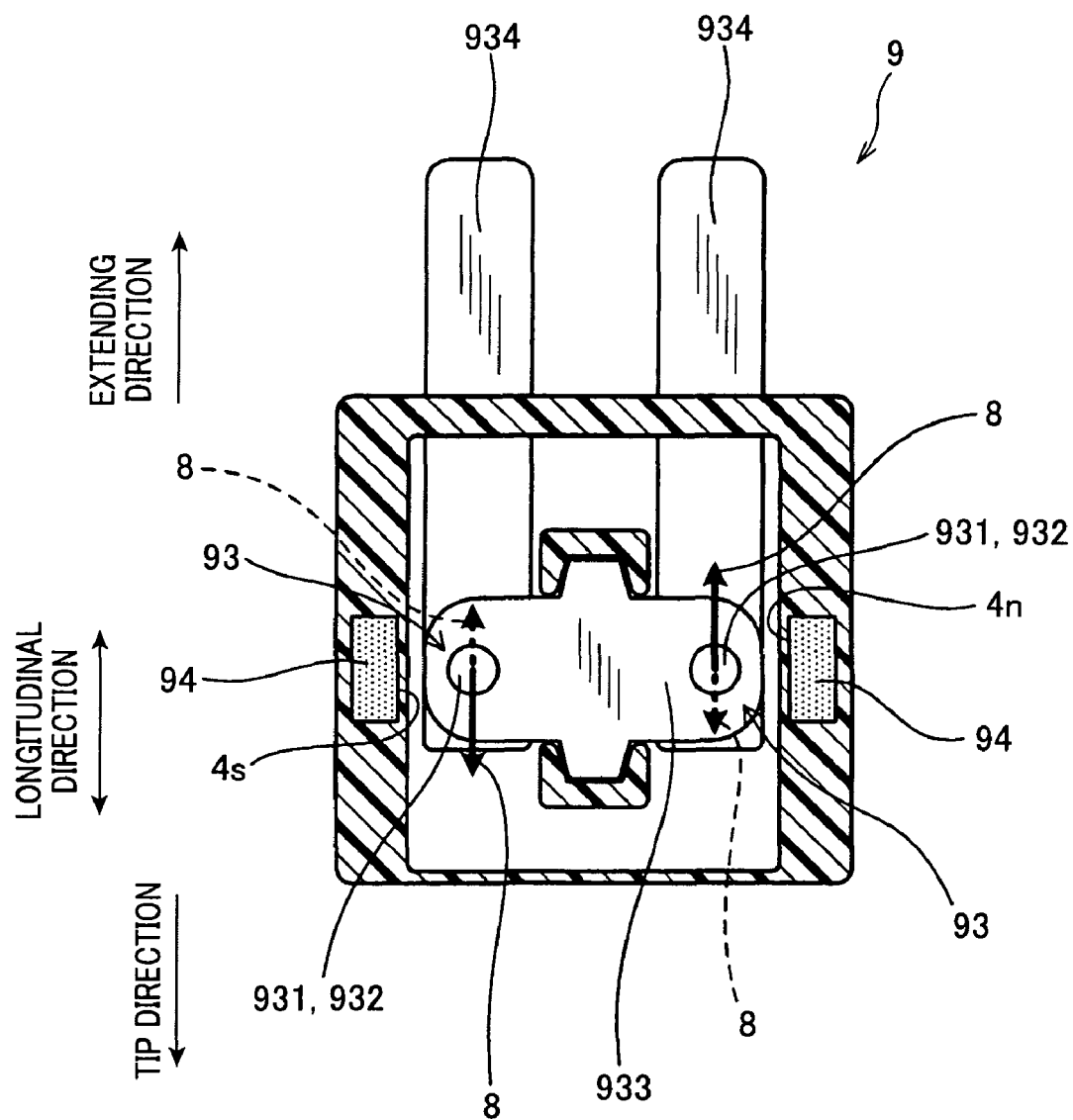
FIG. 1 is a horizontal cross-sectional explanatory diagram of an electromagnetic relay in a conventional example.
Figure 2:
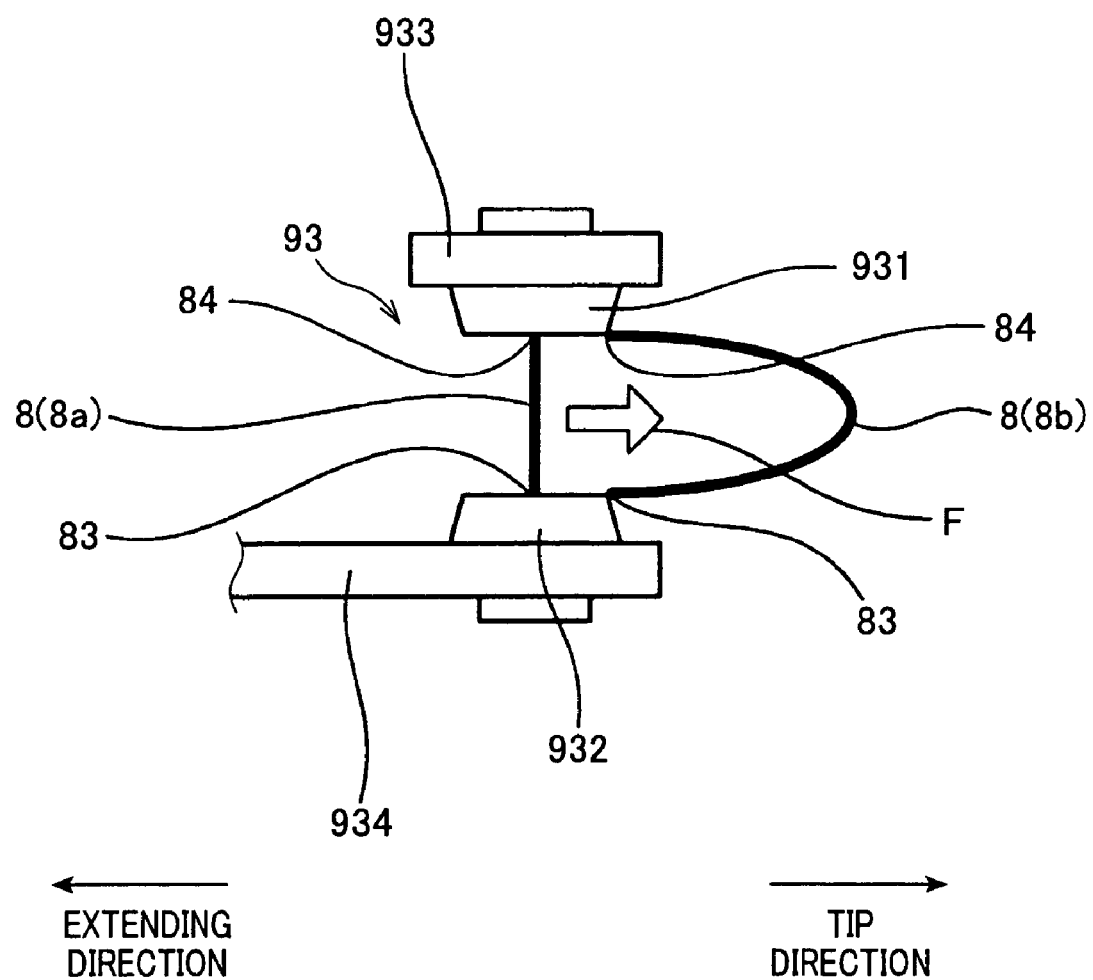
FIG. 2 is an explanatory diagram of an arc generated when the electromagnetic relay switches to an interrupted state in the conventional example.
Figure 3:
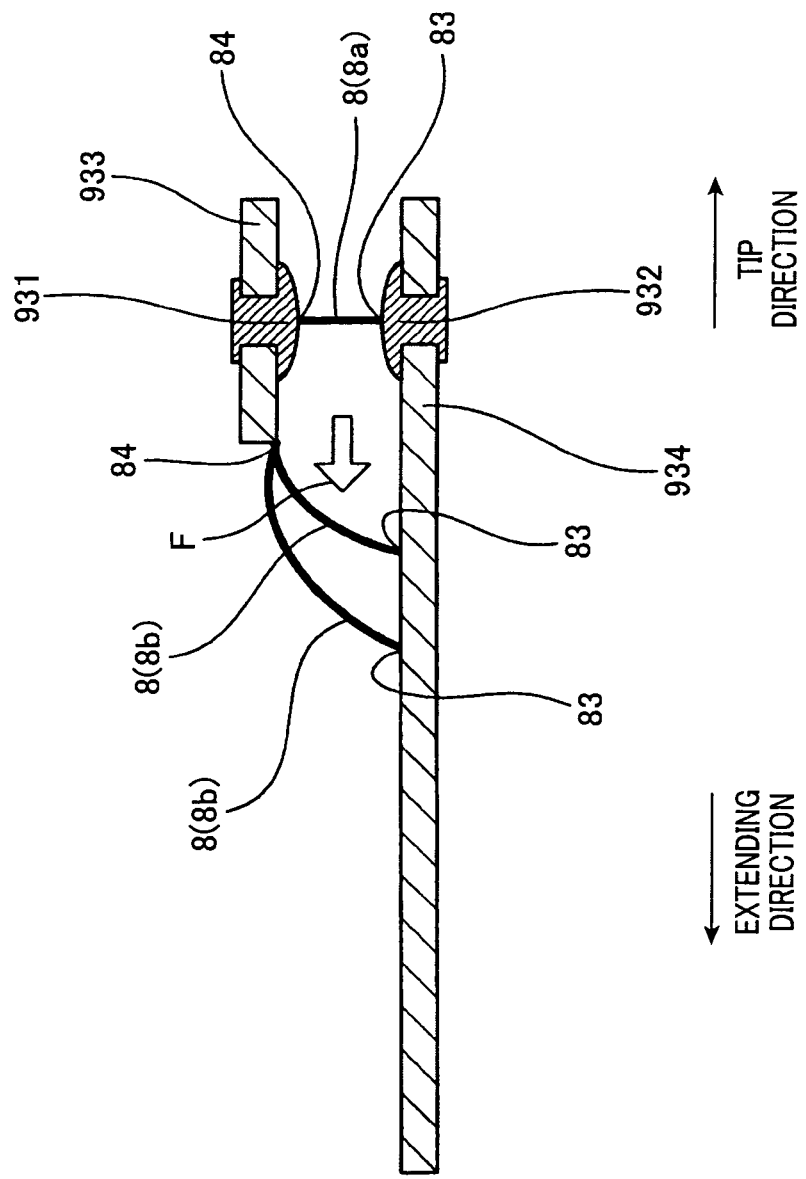
FIG. 3 is an explanatory diagram of movement of an end section of the arc in the conventional example.
Figure 4:
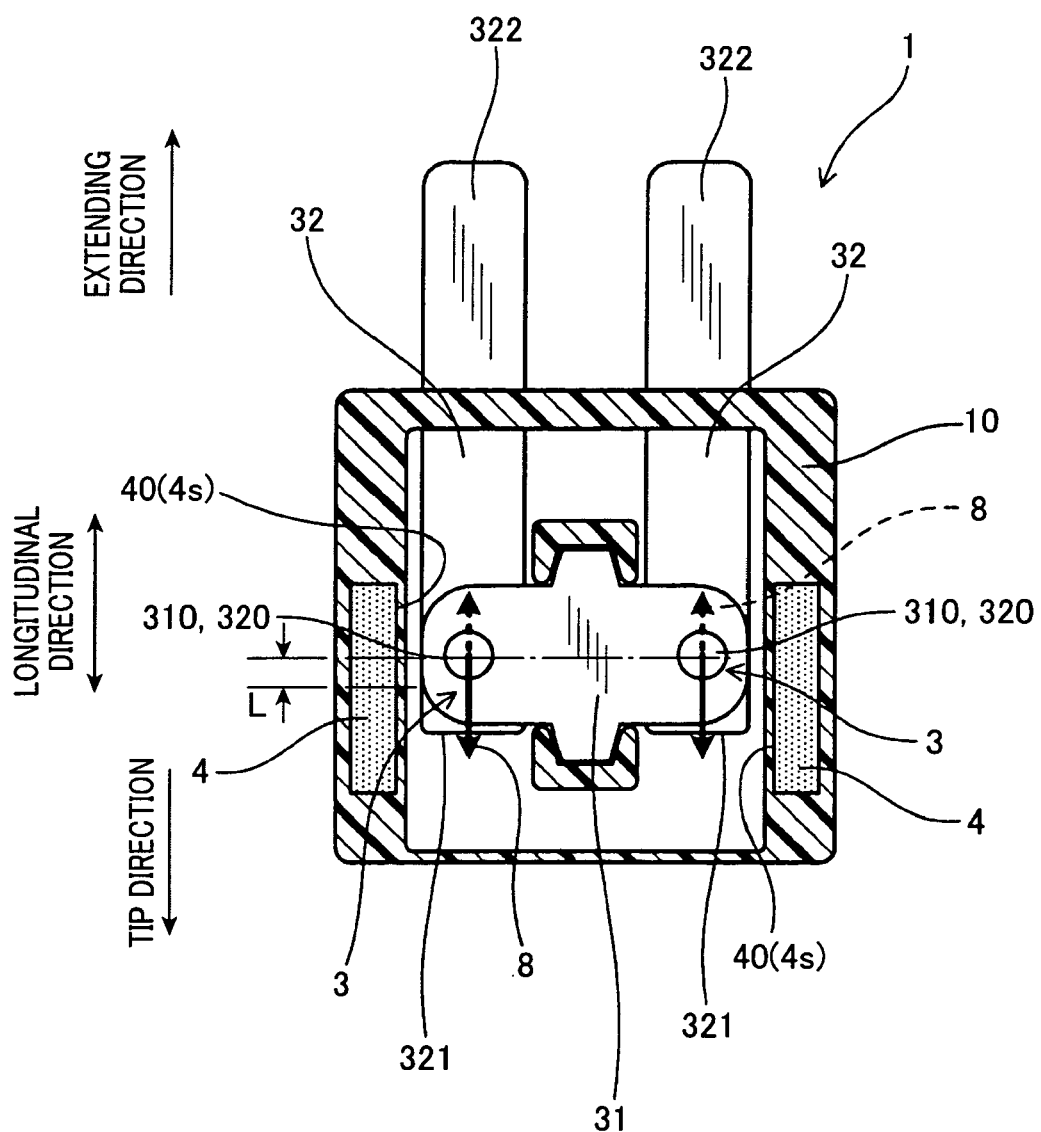
FIG. 4 is a horizontal cross-sectional explanatory diagram of an electromagnetic relay according to a first embodiment of the present invention.
Figure 5:
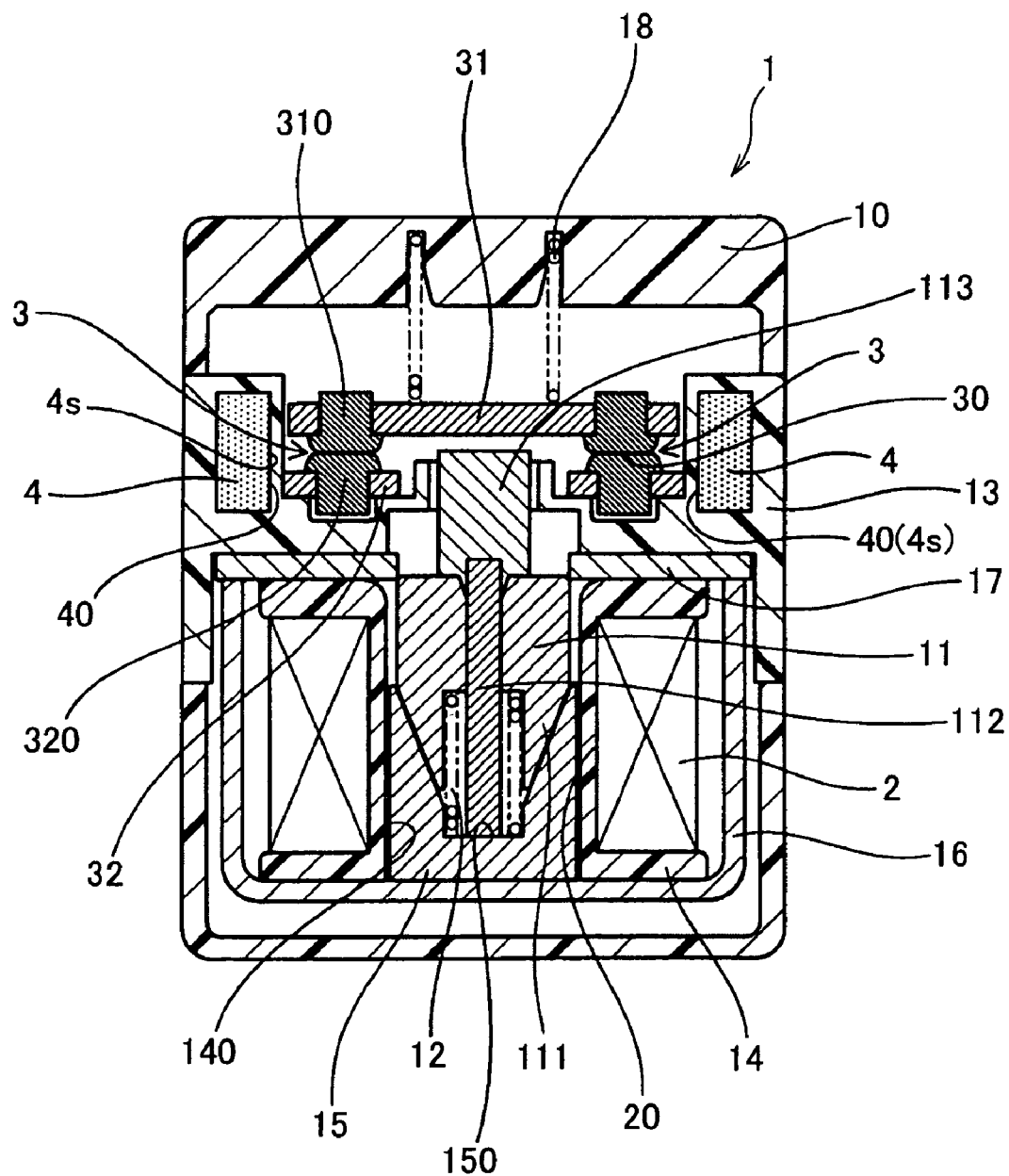
FIG. 5 is a vertical cross-sectional explanatory diagram of the electromagnetic relay in a conductive state according to the first embodiment.
Figure 6:
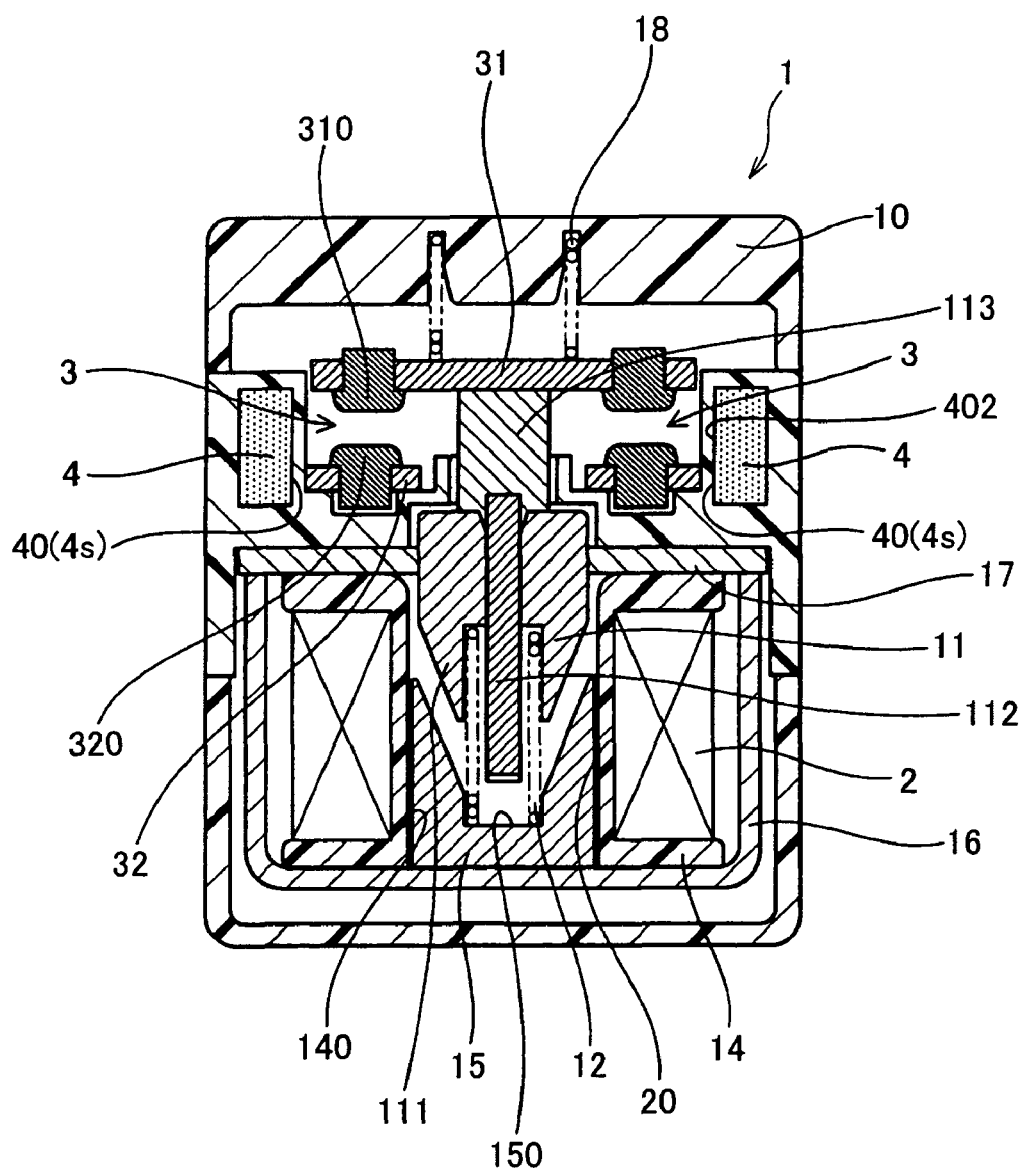
FIG. 6 is a vertical cross-sectional explanatory diagram of the electromagnetic relay in an interrupted state according to the first embodiment.

As shown in FIG. 4 to FIG. 6, the electromagnetic relay 1 includes a coil 2, a pair of contact sections 3, arc-extinguishing magnet members 4, and a main body 10 holding various components of the electromagnetic relay 1. The coil 2 generates a magnetic force by being energized. The pair of contact sections 9 are opened and closed by the magnetic force. An arc-extinguishing magnet member 4 is disposed adjacent to the outer side of each of the contact sections 3. The arc-extinguishing magnet member 4 extends move or pull) an arc 8 generated in the contact section 3 (FIG. 8 and FIG. 9) and extinguishes the arc 8.

The pair of contact sections 3 are configured by a pair of fixed contacts 320 and a pair of movable contacts 310. Each fixed contact 310 is held near a tip section of each of fixed holders 32 that are configured by a pair of conductors fixed to the main body 10. The pair of movable contacts 310 are fixed to a movable holder that is configured by a conductor that moves toward and away from the fixed holder 32 by magnetic force. The pair of movable contacts 310 are disposed such as to oppose the pair of fixed contacts 320.

Figure 8:
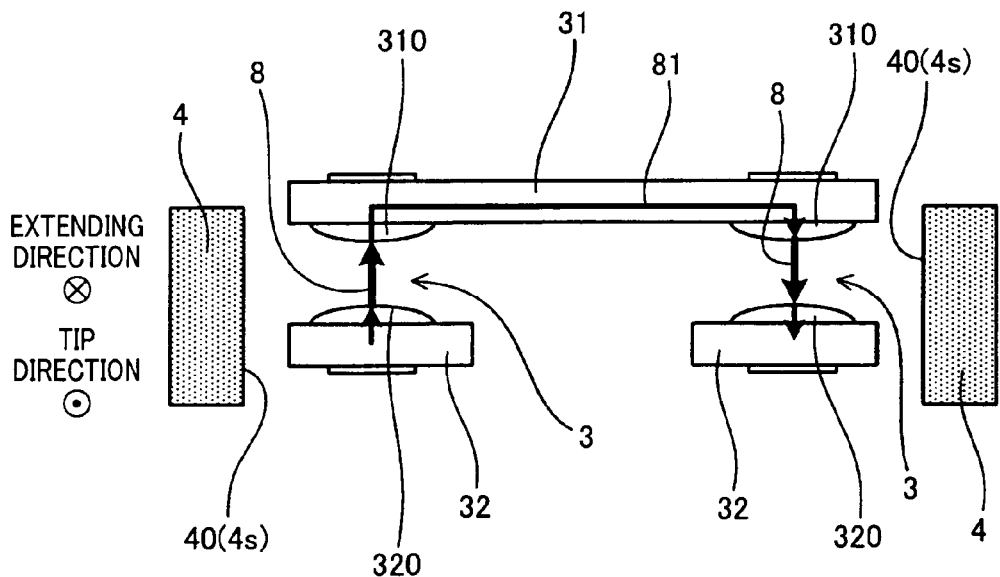
FIG. 8 is an explanatory diagram of the contact section in the interrupted state according to the first embodiment.
Figure 9:
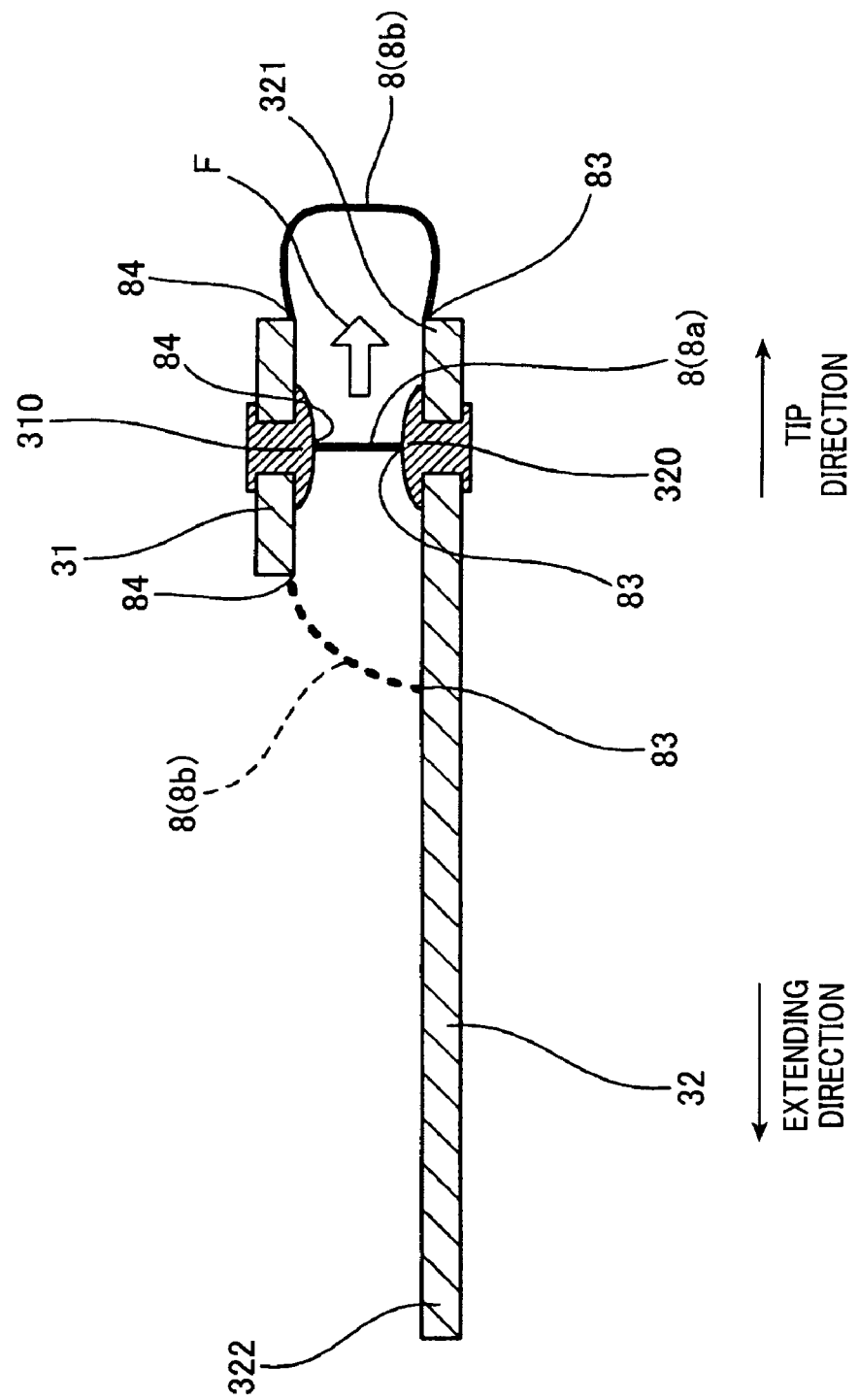
FIG. 9 is an explanatory diagram of an arc generated when the electromagnetic relay switches to the interrupted state.

As shown in FIG. 8 and FIG. 9, both contact sections 3 are configured such that the direction in which the arc-extinguishing magnet member 4 extends the arc 8 generated when a large current is interrupted agrees with a direction directed to the tip section of each fixed holder 32.

in the present embodiment, the direction directed to the tip section of each fixed holder 32, i.e., the downward direction in FIG. 4, is referred to as a tip direction, while the opposite direction to the tip direction, i.e., the upward direction in FIG. 4 is refereed to as an extending direction of each fixed holder 32. Hence, in FIGS. 7 and 8, the tip direction is expressed by an arrow coming from the paper and the extending direction is expressed by an arrow impinging into the paper.

As shown in FIG. 4, the position of the tip section 321 of the fixed holder 32 in the length direction of the fixed holder 32 is within the formation area of a magnetic flux generating surface 40 of the arc-extinguishing magnet member 4 adjacent to the fixed contact 320 provided in the fixed holder 32.

The center of the magnetic flux generating surface 40 is positioned further in the tip direction of the fixed holder 32 than the center of the contact section 3 in the length direction of the fixed holder 32 adjacent to the magnetic flux generating surface 40.

The tip directions of the pair of fixed holders 32 are the same direction. The electrodes of the mutually opposing magnetic flux generating surfaces 40 of the pair of arc-extinguishing magnetic bodies 4 have the same polarity.

As shown in FIG. 5 and FIG. 6, the electromagnetic relay 1 according to the first embodiment includes a movable core 11, the fixed holder 32, and a movable holder 31. The movable core 11 moves forward and backward in an axial direction by the magnetic force generated by the coil 2 fixed to the main body 10. The fixed holder 32 holds the pair of fixed contacts 320 and is fixed to the main body 10. The movable holder 10 holds the pair of movable contacts 310 in a short-circuited state. The pair of movable contacts 310 are disposed such as to oppose the pair of fixed contacts 320.

The pair of movable contacts 310 are crimped and fixed near both end sections of the movable holder 31 that is made of a metal plate so that the movable contacts 310 mutually short-circuit.

The fixed holder 32 is fixed to a pole 13 made of resin. As shown in FIG. 4, the other end of each of the fixed holder 32, which is opposite to the tip section on which each fixed contact 320 is provided, serves as an external terminal 322 and is exposed outside of the electromagnetic relay 1.

The arc-extinguishing magnet members 4 are embedded in the pole 13 by insert-molding, press-fitting, and the like.

As shown in FIG. 4 to FIG. 8, the pair of arc-extinguishing magnet members 4 are disposed such that the opposing magnetic flux generating surfaces 40 have the same polarity. In other words, in each arc-generating magnet body 4, the S-pole 4s faces the contacting section 3.

As shown in FIG. 5 and FIG. 6, the movable core 11 includes a plunger 111, a shaft 112, and an insulator 113. The plunger 111 moves forward and backward in the axial direction within an inner peripheral hole 20 of the coil 2. The shaft 112 is inserted into the plunger 111 and held by the plunger. The insulator 113, formed by an insulating material such as resin, is disposed closer to the movable holder 31 side than the plunger 111 and. The plunger 111, the shaft 112, and the insulator 113 are configured such as to integrally move forward and backward in the axial direction.

The movable core 11 is urged towards the movable holder 31 by a core return means 12. The core return means 12 is disposed such as to be sandwiched between a fixed core 15 and the plunger 111.

The fixed core 15, made of a magnetic material, is disposed within an inner surface 140 of a bobbin 14. The bobbin 14 is disposed such as to cover the inner peripheral hole 20 of the coil 2.

A yoke 16 and a plate 17 made of magnetic materials are provided in the periphery of the coil 2. The fixed core 15, the plunger 111, the plate 17, and the yoke 16 configure a path for the magnetic flux generated as a result of the coil 2 being energized.

Next, operations of the electromagnetic relay 1 according to the first embodiment will be described in detail.

When the coil 2 is energized, a conductive state is created in which the pair of movable contacts 310 and the pair of fixed contacts 320 are in contact, as shown in FIG. 5.

In other words, as a result of the coil 2 being energized, a magnetic flux is generated around the coil 2. Here, the magnetic force generated by the coil 2 being energized is greater than the urging force of the core return means 12. Therefore, as shown in FIG. 5, the movable core 11 is pulled in the direction toward the fixed core 15 by the magnetic force. On the other hand, as shown in FIG. 5, the core return means 12 is pressed toward the coil 2 side by the plunger 111 and is compressed.

As shown in FIG. 5, the movable holder 31 is pressed toward the fixed holder 32 side by a holder urging means 18. Therefore, the movable holder 31 moves towards the fixed holder 32 side in accompaniment with the movable core 11. The movable holder 31 moves integrally with the movable core 11 to a position at which the pair of movable contacts 310 and the pair of fixed contacts 320 come into contact.

Then, because the movable core 11 is continuously pulled towards the coil 2 side even after the movable contacts 310 and the fixed contacts 320 come into contact, the movable holder 31 and the movable core 11 separate at this time. As shown in FIG. 5, the movable core 11 then moves to a position in which the lower end section of the shaft 112 comes into contact with the bottom section 150 provided within the fixed core 15 and stops at this position. At this time, the movable holder 31 is pressed towards the coil 2 side by the holder urging means 18. The movable contact 310 and the fixed contact 320 remain in contact. The movable contact 310 and the fixed contact 320 maintain a state of contact with sufficient contact pressure, thereby creating the conductive state.

Figure 7:
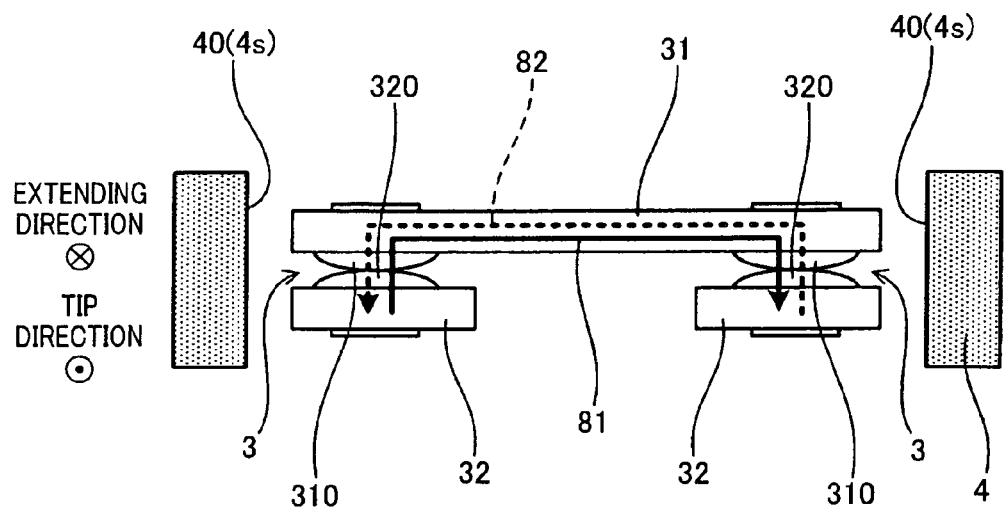
FIG. 7 is an explanatory diagram of a contact section in the conductive state according to the first embodiment.

In the conductive state, as shown in FIG. 7, a large current 81 flowing from one end (external terminal 322) of one fixed holder 32 flows to the movable holder 31 via the fixed contact 320 and the movable contact 310. The large current 81 then flows through the other movable contact 310 and the other fixed contact 320 and flows to the other fixed holder 32. A small current 82 flows through a path that is reverse of the path of the large current 81, as shown by the broken line in FIG. 7.

On the other hand, when the coil 2 is de-energized, as shown in FIG. 6, an interrupted state is created in which the movable contact 310 and the fixed contact 320 are not in contact.

In the interrupted state, the magnetic fore generated by the coil 2 being energized disappears. Therefore, in a manner opposite to that in the conductive state, the movable core 11 is pressed toward the movable holder 31 side by the core return means 12.

In other words, because the urging force of the core return means 12 is greater than the urging force of the holder urging means 18, the movable holder 31 is pressed by the movable core 11 and moves in the direction away from the coil 2 with the movable core 11. The movable holder 31 then moves in a direction in which the pair of movable contacts 310 and the pair of fixed contacts 320 separate. The interrupted state is created in which the movable contacts 310 and the fixed contacts 320 are not in contact.

Here, when the electromagnetic relay 1 transits from the conductive state to the interrupted state, as shown in FIG. 8, the arc 8 may be generated between the movable contact 310 and the fixed contact 320. When, for example, unlike the first embodiment, the arc-extinguishing magnet member 4 is not provided, the arc 8 flows passing through the shortest distance between the movable contact 310 and the fixed contact 320 (see reference number 8a in FIG. 9). As a result, the large current 81 flows and causes a short circuit even in the interrupted state. When the short-circuited state continues, the electromagnetic relay 1 and each electronic component configuring the circuit in which the electromagnetic relay 1 is incorporated may become destroyed.

On the other hand, as a result of the arc-extinguishing magnet member 4 according to the first embodiment being provided, the arc 8 can be extended and extinguished as shown in FIG. 9.

Here, before Lorentz force F acts on the arc 8, the arc 8 has the end point 84 at the movable point 310 and the end point 83 at the fixed point 320, as indicated by the reference number 8a. However, when the arc 8 (8b) moves as a result of generating the Lorentz force F, the end point 84 moves to the movable holder 31 and the end point 84 moves to the fixed holder 32.

However, the end point 83 of the arc 8 generated when the large current 81 is interrupted reaches the tip section 321 of the fixed holder 32 as shown by the solid line indicated by reference number 8b. Therefore, the end point 83 does not move any further. The arc 8 (8b) is sufficiently extended and can be extinguished.

On the other hand, the end point 83 of the arc 8 generated when the small current 8 is interrupted moves to the extending side (external terminal 322 side) of the fixed holder 32 as shown by the broken line indicated by the reference number 8b. Therefore, the end point 83 moves a significant distance along the fixed holder 32. Therefore, the arc 8 cannot be significantly extended. However, because the arc 8 based on the small current 82 can be extinguished with relative ease, the arc 8 can be extinguished even when the distance by which the arc 8 is extended is small.

In this way, the large current 81 (current during power running) and the small current 82 (current during regeneration) in opposing directions can be smoothly interrupted.

Figure 10:
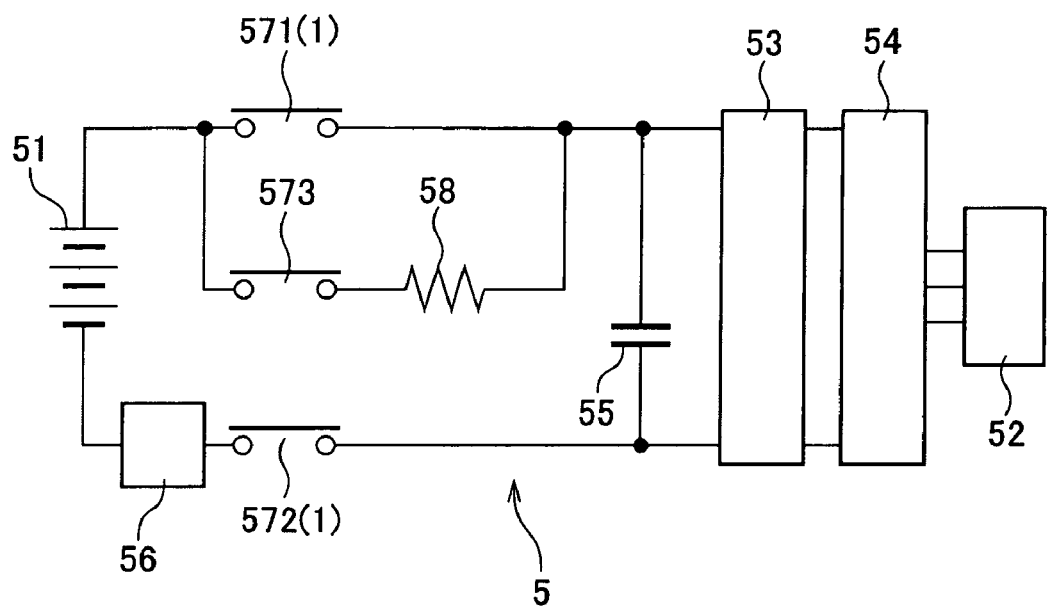
FIG. 10 is a diagram of a power supply circuit including the electromagnetic relay.

As shown in FIG. 10, the electromagnetic relay 1 is used such as to be incorporated in a power supply circuit 5 that drives a driving motor of an electric vehicle, a hybrid vehicle, and the like.

The power supply circuit 5 is formed between a direct-current power supply 51 and an electrical rotating machine 52 that is a three-phase alternating current driving motor. The power supply 5 includes a converter 53 and an inverter 54. The converter 53 steps up the direct current power supply 51 or steps down regenerative power. The inverter 54 performs conversion between direct-current power and alternating-current power. The electromagnetic relays 1 are connected to the positive-side current path and to the negative-side current path between the converter 53 and the inverter 54, and the direct current power supply 51, respectively serving as main relays 571 and 572. A precharge relay 573 connected in series with a resistor 58 is further connected in parallel with the main relay 571 provided in the positive-side current path. The precharge relay 573 may or may not be the electromagnetic relay 1 of the present invention.

A capacitor 55 is connected between the positive-side current path and the negative-side current path in a suspended manner. The current sensor 56 is connected between the main relay 572 on the negative side and the direct-current power supply 51.

As a result of the above-described configuration, switching is performed between conduction and interruption of the current between the direct power supply 51, and the converter 53 and the inverter 54. In the electromagnetic relay 1, the large current 81 in the power running direction, supplied from the direct-current power supply 51 to the electrical rotating machine 52, flows. Alternatively, the small current 82 in the regenerating direction, collected from the electrical rotating machine 52 to the direct-current power supply 51, flows (see FIG. 7). The large current 81 in the power running direction is greater than the small current 82 in the regenerating direction.

Following operations are performed in the power supply circuit 5.

In other words, when an ignition key of a vehicle is first turned ON, the main relay 572 on the negative side and the precharge relay 573 are sequentially turned ON (conductive state is entered). Charging of the capacitor 55 begins. At this time, the resistor 58 restricts the flow of inrush current into the power supply circuit 5. The capacitor 55 is gradually charged.

After the capacitor 55 is charged, the main relay 571 on the positive side is turned ON. Power supply to the electrical rotating machine 52 is started. The precharge relay 573 is turned OFF. During this time, the current (large current 81) in the power running direction flows through the electromagnetic relay 1.

In this state, the power collected in the electrical rotating machine 52 is returned to the direct-current power supply 51 through the power supply circuit 5. In other words, the current (small current 82) in the regenerating direction opposite of the power running direction flows through the electromagnetic relay 1 at this time.

Then, when the ignition key is turned OFF, the two main relays 571 and 572 are turned OFF, and conduction in the power supply circuit 5 is interrupted.

When an abnormality occurs in the electrical rotating machine 52, the converter 53, the inverter 54, or the like, the electromagnetic relays 1 configuring the main relays 571 and 572 switch to the interrupted state. As a result, the current is interrupted, and each electronic component is protected.

Next, effects achieved according to the first embodiment will be described.

The electromagnetic relay 1 according to the first embodiment is configured such that, in both contact sections 3, the direction in which the arc-extinguishing magnet member 4 extends the arc 8 generated when the large current 81 of the currents in both directions is interrupted is the tip direction of the fixed holder 32. As a result, the currents in both directions can be smoothly interrupted.

In other words, the direction in which the arc-extinguishing magnet member 4 extends the arc 8 changes between opposing directions based on the direction of the current flow when the current is interrupted. Therefore, as described above, the electromagnetic relay 1 cannot be set such that the direction in which the arc 8 is extended is the direction opposite to the extending direction of the fixed holder 32, namely the tip direction of the fixed holder 32, when either one of the currents flowing in the two mutually-opposite directions is interrupted.

However, although the arc 8 is required to be extended by a greater distance to extinguish the arc 8 generated when the large current 81 having the large current value is interrupted, when the arc 8 generated when the small current 82 having the small current value is interrupted is extinguished, the distance by which the arc 8 is extended is relatively small. Therefore, even when the direction in which the arc 8 generated when the small current 82 is interrupted is extended matches the extending direction of the fixed holder 32 and the distance by which the arc 8 is extended is small, arc extinction can be performed with relative smoothness. On the other hand, when the direction in which the arc 8 generated when the large current 81 is interrupted is extended matches the extending direction of the fixed holder 32 and the distance by which the arc 8 is extended is small, arc extinction may be difficult to perform.

Therefore, as shown in FIG. 9, the present invention is configured such that the direction in which the arc-extinguishing magnet member 4 extends the arc 8 generated when the large current 81 is interrupted is the tip direction of the fixed holder 32. As a result, the arc 8 generated when the large current 81 is interrupted, that is difficult to extinguish, can be extended with ease. Arc extinction can be facilitated.

As a result, the arc 8 can be smoothly extinguished when both the large current 81 and the small current 82 flowing in mutually opposite directions are interrupted. The currents can be smoothly interrupted.

The position of the tip section 321 of the fixed holder 32 in the length direction position of the fixed holder 32 within the formation area of the magnetic flux generating surface 40 of the arc-extinguishing magnet member 4 adjacent to the fixed contact 320 provided in the fixed holder 32. Therefore, the arc 8 generated when the large current 81 is interrupted can be significantly extended in the tip direction of the fixed holder 32. In other words, because the magnetic flux generated from the magnetic flux generating surface 40 is sufficiently formed in the tip section 321 of the fixed holder 32 as well, the arc 8 can be sufficiently extended towards the tip side from the tip section 321 of the fixed holder 32.

As shown in FIG. 4, the center of the magnetic flux generating surface 40 of the arc-extinguishing magnet member 4 is positioned further in the tip direction, by a length L, than the center of the contact section 3 in the longitudinal direction of the fixed holder 32 adjacent to the magnetic flux generating surface 40. Therefore, the arc 8 generated when the large current 81 is interrupted can be effectively extended. In addition, the arc-extinguishing magnet member 4 can be made more compact.

The tip directions of the pair of fixed holders 32 are the same direction. The electrodes of the mutually opposing magnetic flux generating surfaces 40 of the pair of arc-extinguishing magnetic bodies 4 have the same polarity (S-pole 4s). Therefore, the arcs 8 generated at the pair of contact sections 3 when the large current 81 is interrupted can be extended to the tip side of the fixed holder 32. In other words, because the electrodes of the magnetic flux generating surfaces 40 of the pair of arc-extinguishing magnet members 4 are the same, the directions in which the arcs 8 at the pair of contact sections 3 are extended can be the same direction. When the tip directions of the pair of fixed holders 32 are the same, this direction can be matched with the direction in which the arc 8 generated when the large current 81 is interrupted is extended.

Because the tip directions of the fixed holders 32 are the same, the external terminals 322 formed opposite to the tip sections 321 in the fixed holders 32 can be projected in the same direction in the electromagnetic relay 1. As a result, external wiring of the electromagnetic relay 1 can be facilitated.

As described above, according to the first embodiment, an electromagnetic relay is provided that can smoothly interrupt the currents in both directions having mutually different sizes.

Second Embodiment

Figure 11:
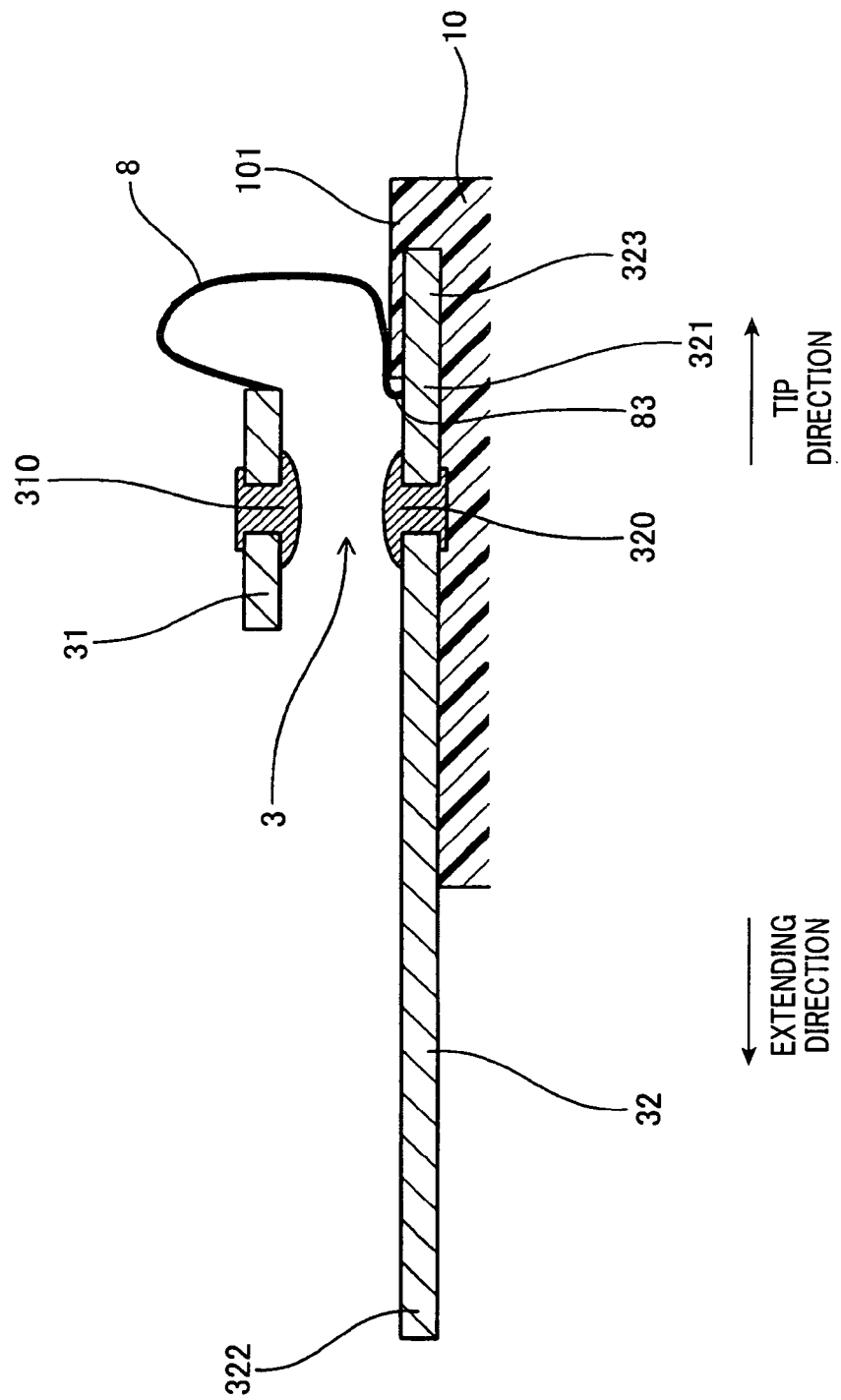
FIG. 11 is a cross-sectional explanatory diagram of a contact section along a length direction of a fixed holder according to a second embodiment of the present invention.

With reference to FIG. 11, an electromagnetic relay according to a second embodiment of the present invention will now be described.

In the present embodiment and subsequent embodiments, the components similar or identical to those employed in the foregoing first embodiment will be given the same reference numerals as those in the first embodiment for the sake of a simplified explanation.

As shown in FIG. 11, according to the second embodiment, an example is given in which the fixed holder 32 has an extension section 323 extending further to the tip side than the tip section 321. The extension section 323 is embedded within an insulating resin member 101.

In other words, a portion of the tip side of the fixed holder 32 according to the second embodiment is covered by the insulating resin member 101. The portion of the fixed holder 32 covered by the insulating resin member 101 is the extension section 323. The portion of the exposed portion positioned closest to the tip is the tip section 321.

The fixed holder 32 is insert-molded onto the main body 10 configured by the insulating resin member 101.

In the electromagnetic relay 1 according to the second embodiment, the one end point 83 of the arc 8 generated when the large current 81 is interrupted moves to the portion positioned closest to the tip side in the exposed portion of the fixed holder 32, namely the tip section 321 as a result of generating the Lorentz force F attributed to the magnetic field generated by the arc-extinguishing magnet member 4.

Other configurations are the same as those according to the first embodiment.

According to the second embodiment, the fixed holder 32 can be stably fixed to the main body 10.

Other effects similar to those according to the first embodiment can be achieved.

Third Embodiment

Figure 12:
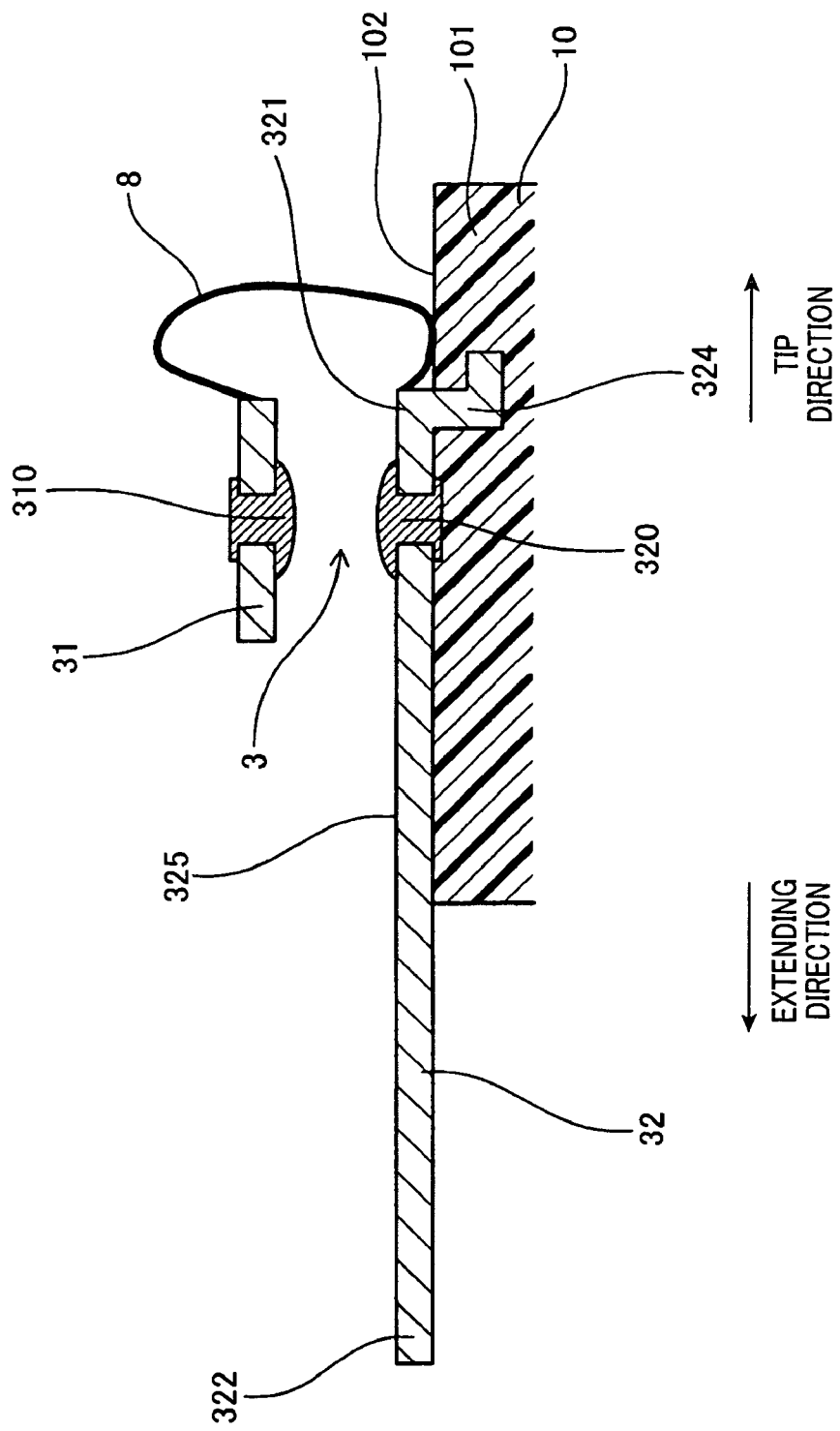
FIG. 12 is a cross-sectional explanatory diagram of a contact section along a length direction of a fixed holder according to a third embodiment of the present invention.

With reference to FIG. 12, an electromagnetic relay according to a second embodiment of the present invention will now be described.

As shown in FIG. 12, according to the third embodiment, an example is given in which the fixed holder 32 has a bent extension section 324 that bends from the tip section 321 to the side opposite of the movable holder 31. The bent extension section 324 is embedded within the insulating resin member 101.

A surface 102 of the insulating resin member 101 recedes further back than an opposing surface 325 of the fixed holder 32 opposing the movable holder 31. According to the third embodiment, the bent extension section 324 is bent further to the tip side within the insulating resin member 101.

Other configurations are the same as those according to the first embodiment.

According to the third embodiment, the fixed holder 32 can be stably fixed to the main body 10. In addition, the insulating resin member 101 is prevented from inhibiting the extension of the arc 8.

Other effects similar to those according to the first embodiment can be achieved.

Fourth Embodiment

Figure 13:
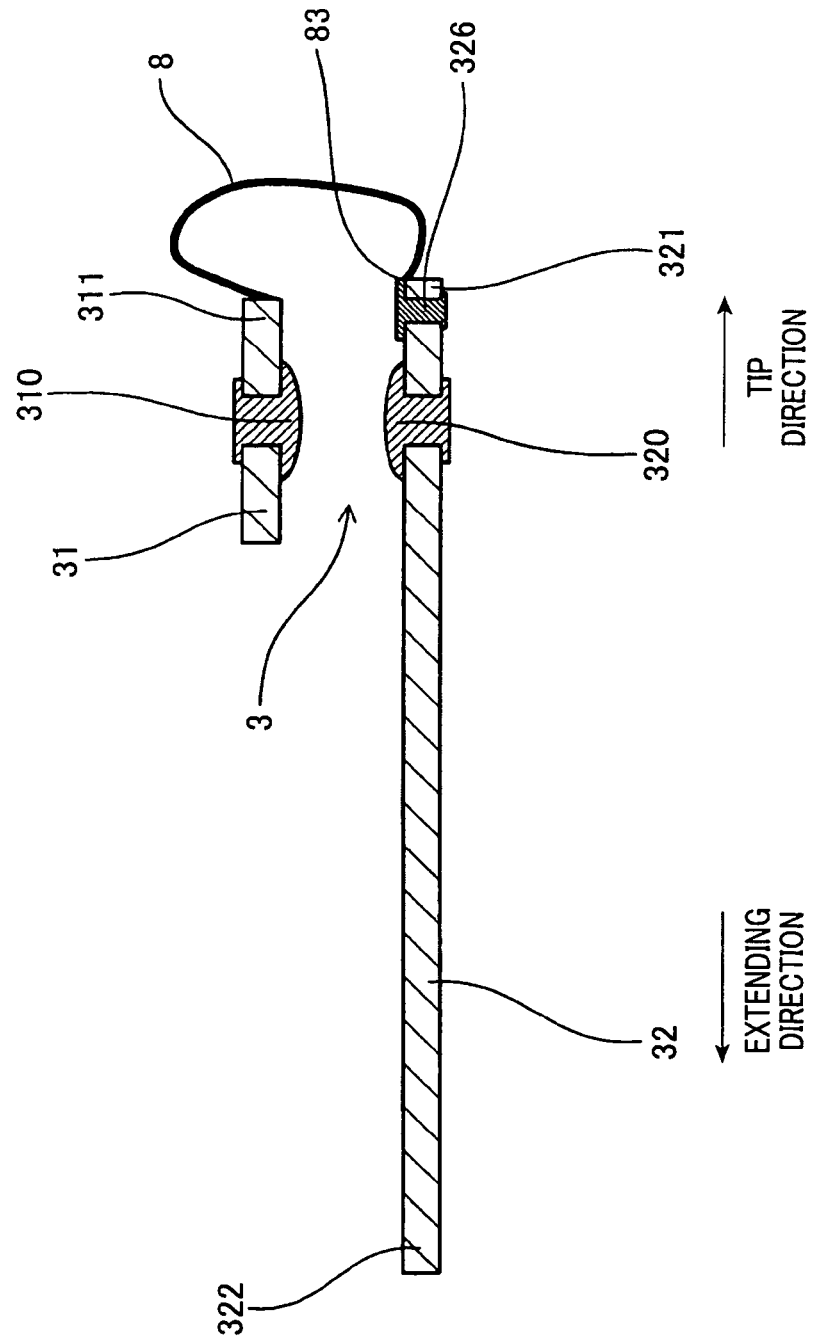
FIG. 13 is a cross-sectional explanatory diagram of a contact section along a length direction of a fixed holder according to a fourth embodiment of the present invention.

With reference to FIG. 13, an electromagnetic relay according to a second embodiment of the present invention will now be described.

As shown in FIG. 13, according to the fourth embodiment, an example is given in which a low-conductivity section 326 is provided in the tip section 321 of the fixed holder 32. The low-conductivity section 326 is made of a conductor having lower conductivity than the fixed holder 32.

According to the fourth embodiment, the fixed holder 32 is made of copper. The fixed contact 320 is made of silver. The low-conductivity section 326 is made of iron. The movable holder 31 is made of copper, and the movable contact 310 is made of silver.

The low-conductivity section 326 is crimped and fixed to the fixed holder 32.

Other configurations are the same as those according to the first embodiment.

According to the fourth embodiment, when the arc 8 generated when the large current 81 is interrupted is extended in the tip direction of the fixed holder 32 by the Lorentz force F attributed to the magnetic field of the arc-extinguishing magnet member 4, the end point 83 of the arc 8 moves to the low-conductivity section 326. As a result, the current value of the arc 8 decreases because of the electrical resistance of the low-conductivity section 326. The arc 8 is more easily extinguished.

The low-conductivity section 326 is made of iron. Therefore, an inexpensive low-conductivity section 326 can be achieved. In addition, sufficient electrical resistance can be achieved in the low-conductivity section 326.

The low-conductivity section 326 is crimped and fixed to the fixed holder 32. Therefore, the low-conductivity section 326 can be fixed to the fixed holder 32 with ease and certainty.

Other effects similar to those according to the first embodiment can be achieved.

The low-conductivity section 326 can be provided in an end section 311 of the movable holder 31 disposed such as to oppose the tip section 321 of the fixed holder 32, instead of in the tip section 321 of the fixed holder 32 or in addition to the tip section 321.

Fifth Embodiment

Figure 14:
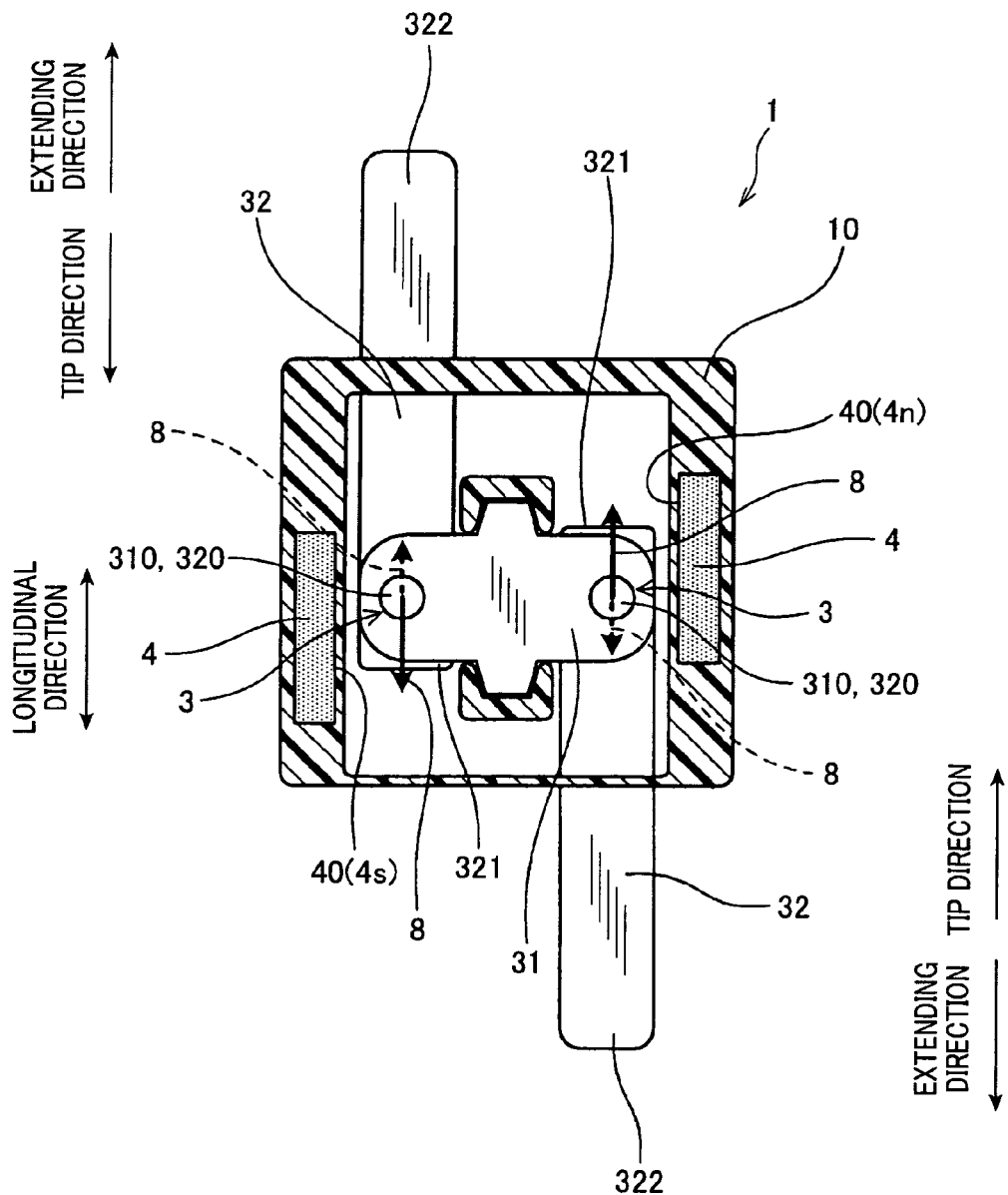
FIG. 14 is a horizontal cross-sectional explanatory diagram of an electromagnetic relay according to a fifth embodiment of the present invention.

With reference to FIG. 14, an electromagnetic relay according to a second embodiment of the present invention will now be described.

As shown in FIG. 14, according to the fifth embodiment, an example of the electromagnetic relay 1 is given in which the tip directions of the pair of fixed holders 32 are opposite directions. The electrodes of the mutually opposing magnetic flux generating surfaces 40 of the pair of arc-extinguishing magnet members 4 have opposite polarities.

The magnetic flux generating surface 40 of the arc-extinguishing magnet member 4 opposing one contact section 3 is the S-pole 4s. The magnetic flux generating surface 40 of the arc-extinguishing magnet member 4 opposing the other contact section 3 is N-pole 4n.

Other configurations are the same as those according to the first embodiment.

According to the fifth embodiment, the arc-extinguishing magnet member 4 extends the arc 8 generated when the large current 81 is interrupted in opposite directions in the two contact sections 3. The direction of the tip section 321 of the fixed holder 32 disposed in each contact section 3 is set to match the direction in which the arc 8 is extended.

Therefore, in a manner similar to that according to the first embodiment, in both contact sections 3, the direction of the tip section 321 of the fixed holder 32 can be matched with the direction in which the arc 8 is extended when the large current 81 is interrupted (see the solid-fine arrow 8 in FIG. 11).

Other effects similar to those according to the first embodiment can be achieved.

According to the first embodiment, an example is given in which both magnetic flux generating surfaces 40 of the pair of arc-extinguishing magnet members 4 opposing the contact sections 3 is the S-pole 4s. However, the polarity of both magnetic flux generating surfaces 40 can be N-pole. However, in this instance, the tip directions of the pair of fixed holders 32 are opposite to that according to the first embodiment. Alternatively, the directions of the currents flowing through the contact section 3 (large current 81 and small current 82) are reversed.

According to the fifth embodiment, the magnetic pole of the magnetic flux generating surface 40 can be changed by the tip direction of the fixed holder 32 or the direction of current flow being changed accordingly.

In other words, in both contact sections 3, as long as a configuration can be achieved in which the direction in which the arc-extinguishing magnet member 4 extends the arc 8 generated when the large current 81 is interrupted is the tip direction of the fixed holder 32, the magnetic pole of the arc-extinguishing magnet member 4, the tip direction of the fixed holder 32, and the like can be changed in various ways.

Various modes of the present invention have so far been described. However, the present invention is not intended to be limited to the modes described above, but may be modified in various manners. Such various modifications however are also intended to be encompassed by the present invention.

What is claimed is:

1. An electromagnetic relay that switches between conducting and interrupting currents flowing through the electromagnetic relay, the currents being two types of currents which are different in magnitude from each other and which flow through mutually opposite paths which are via the electromagnetic relay, comprising:

a coil that generates a magnetic force by being energized;

a pair of contact sections that open and close by the magnetic force, wherein the pair of contact sections comprises a pair of fixed contacts and a pair of movable contacts, the pair of fixed contacts being held by a pair of fixed holders made of conducting material and formed to be plate-shaped, each of the fixed holders presenting a longitudinal direction in which each of the fixed holders extend and having a tip section located in the longitudinal direction, each of the fixed contacts being held on a corresponding one of the fixed holders so as to be located near the tip section of the corresponding one of the fixed holders, the pair of movable contacts being fixed to a movable holder made of conducting material, disposed to be opposed to the pair of fixed contacts, and formed to move toward and away from the fixed holders in response to the magnetic force; and two arc-extinguishing magnet members that each spatially extend an arc generated by each of the two types of currents having mutually different magnitudes and passing in mutually opposite directions through the contact sections, the arc-extinguishing magnet members being located to be adjacent to the contact sections such that, the arc generated at each of the contact sections by interrupting, of the two types of currents, one current having a magnitude larger than the other current is extended outward from the tip section along the longitudinal direction in which each of the fixed holders extends.

2. The electromagnetic relay of claim 1, wherein the tip sections of the pair of fixed holders are directed in the same direction, and the magnetic flux generating surfaces of the pair of arc-extinguishing magnet members, which face with each other, have electrodes whose polarities are the same.

3. The electromagnetic relay of claim 1, wherein the arc-extinguishing magnet members are located to extend the arc generated by interrupting the other current having a magnitude smaller than the one current in a direction opposite to an extended direction of the arc generated by interrupting the one current in the longitudinal direction.

4. The electromagnetic relay of claim 3, wherein each of the arc-extinguishing magnet members has a magnetic flux generating surface from which magnetic flux is generated for extinguishing the arc,
the tip section of each of the fixed holders has an end in a longitudinal direction of the fixed holders, the end being positioned to be opposed to the magnetic flux generating surface of each of the arc-extinguishing magnet members so that each of the fixed contacts is positioned within an atmosphere produced by the magnetic flux.

5. The electromagnetic relay of claim 4, wherein each of the fixed holders has an extension section extended from the tip section in the longitudinal direction in which the tip section extends, the extension section being embedded within an insulating resin member.

6. The electromagnetic relay of claim 5, wherein each of the fixed holders is insert-molded onto a main body of the electromagnetic relay.

7. The electromagnetic relay of claim 6, wherein a central position of the magnetic flux generating surface of each of the arc-extinguishing magnet members in a longitudinal direction is biased more than a central position of each of the contact sections toward the tip section of each of the fixed holders in the longitudinal direction.

8. The electromagnetic relay of claim 7, wherein the tip sections of the pair of fixed holders are directed in the same direction, and the magnetic flux generating surfaces of the paired arc-extinguishing magnet members, which face each other, have electrodes whose polarities are the same.

9. The electromagnetic relay of claim 8, wherein at least one of each of the tip ends of the fixed holders and each of sections of the movable holders has a low-conductivity section which is smaller in electric conductivity than either ones of the fixed holders and the movable holders, the low-conductivity sections being opposed to the tip ends of the fixed holders.

10. The electromagnetic relay of claim 9, wherein the low-conductivity section is made of iron.

11. The electromagnetic relay of claim 10, wherein the low-conductivity sections are crimped to at least ones of the fixed holders and the movable holders.

12. The electromagnetic relay of claim 4, wherein each of the fixed holders has a bent extension section which is extended from the tip section, bent in a direction opposite to the movable holder, and embedded in an insulating resin member, wherein the insulating resin member has a surface which recedes more than a surface of the fixed holder, the surface of the fixed holder being opposed to the movable holder.

13. The electromagnetic relay of claim 12, wherein each of the fixed holders is insert-molded onto a main body of the electromagnetic relay.

14. The electromagnetic relay of claim 13, wherein a central position of the magnetic flux generating surface of each of the arc-extinguishing magnet members in a longitudinal direction is biased more than a central position of each of the contact sections toward the tip section of each of the fixed holders in the longitudinal direction.

15. The electromagnetic relay of claim 14, wherein the tip sections of the pair of fixed holders are directed in the same direction, and the magnetic flux generating surfaces of the pair of arc-extinguishing magnet members, which face each other, have electrodes whose polarities are the same.

16. The electromagnetic relay of claim 15, wherein at least one of each of the tip ends of the fixed holders and each of sections of the movable holders has a low-conductivity section which is smaller in electric conductivity than either ones of the fixed holders and the movable holders, the low-conductivity sections being opposed to the tip ends of the fixed holders.

17. The electromagnetic relay of claim 16, wherein the low-conductivity section is made of iron.

18. The electromagnetic relay of claim 17, wherein the low-conductivity sections are crimped to at least ones of the fixed holders and the movable holders.

19. The electromagnetic relay of claim 3, wherein a central position of the magnetic flux generating surface of each of the arc-extinguishing magnet members in a longitudinal direction is biased more than a central position of each of the contact sections toward the tip section of each of the fixed holders in the longitudinal direction.

20. The electromagnetic relay of claim 3, wherein at least one of each of the tip sections of the fixed holders and each of ends of the movable holders has a low-conductivity section which is smaller in electric conductivity than either ones of the fixed holders and the movable holders, the low-conductivity sections being opposed to the tip ends of the fixed holders.

21. The electromagnetic relay of claim 3, wherein
each of the fixed holders is a plate member having an end extended oppositely
to the tip section in the longitudinal direction, the end of each of the fixed holders serving as an electrical terminal of the relay, and
the fixed holders are disposed to cross with a direction in which the movable holder through which the two types of currents pass.

* * * * *